United States Patent
Peyrotte

(10) Patent No.: US 9,063,221 B2
(45) Date of Patent: Jun. 23, 2015

(54) SATELLITE PAYLOAD FOR AUGMENTATION SYSTEMS

(75) Inventor: Christian Peyrotte, Toulouse (FR)

(73) Assignee: THALES, Courbevoie (FR)

( * ) Notice: Subject to any disclaimer, the term of this patent is extended or adjusted under 35 U.S.C. 154(b) by 342 days.

(21) Appl. No.: 13/566,786

(22) Filed: Aug. 3, 2012

(65) Prior Publication Data

US 2013/0034124 A1   Feb. 7, 2013

(30) Foreign Application Priority Data

Aug. 5, 2011   (FR) ...................................... 11 02464

(51) Int. Cl.
*H04B 1/00* (2006.01)
*G01S 19/02* (2010.01)
*G01S 19/08* (2010.01)

(52) U.S. Cl.
CPC ...... *G01S 19/02* (2013.01); *G01S 19/08* (2013.01)

(58) Field of Classification Search
USPC .................. 375/140, 144, 148, 149, 137, 134
See application file for complete search history.

(56) References Cited

U.S. PATENT DOCUMENTS

| | | | |
|---|---|---|---|
| 6,463,279 B1 * | 10/2002 | Sherman et al. | 455/427 |
| 7,460,828 B2 | 12/2008 | Dodel | |
| 8,401,546 B2 * | 3/2013 | Landry et al. | 455/427 |
| 2003/0137964 A1 * | 7/2003 | Suenaga et al. | 370/342 |
| 2005/0041955 A1 | 2/2005 | Beuque | |
| 2009/0179743 A1 | 7/2009 | Amtmann | |
| 2010/0177678 A1 * | 7/2010 | Sayegh | 370/315 |
| 2010/0303235 A1 | 12/2010 | Damidaux | |
| 2011/0001668 A1 * | 1/2011 | Cobb et al. | 342/458 |
| 2011/0068958 A1 * | 3/2011 | Knight et al. | 341/51 |
| 2011/0261805 A1 * | 10/2011 | Landry et al. | 370/342 |
| 2012/0281736 A1 * | 11/2012 | Pratt et al. | 375/150 |
| 2013/0100879 A1 * | 4/2013 | Sayegh | 370/316 |
| 2014/0016722 A1 * | 1/2014 | Torimoto et al. | 375/295 |
| 2014/0062781 A1 * | 3/2014 | Mathews et al. | 342/357.64 |

FOREIGN PATENT DOCUMENTS

FR   2921528 A1   3/2009

OTHER PUBLICATIONS

Javier Ventura-Traveset, et al., "EGNOS GEO Replenishment: Planning for the Future", URL:http://www.egnos-pro.esa.int/Publications/GNSS%202000/GNSS2000_GEO.pdf, Jan. 1, 2000, pp. 1-11, XP55020792.

(Continued)

*Primary Examiner* — Emmanuel Bayard
(74) *Attorney, Agent, or Firm* — Baker Hostetler LLP

(57) ABSTRACT

A payload for augmentation satellite comprising an input channel suitable for receiving navigation signals transmitted by at least one navigation land earth station in a first frequency band and a plurality of output channels, each suitable for broadcasting navigation signals in a frequency band different from said first band and from other broadcasting bands, characterized in that it also comprises a navigation processor. A satellite comprising such a payload and an augmentation system comprising such a satellite is also provided.

20 Claims, 7 Drawing Sheets

(56) References Cited

OTHER PUBLICATIONS

D. Ilcev, et al., "European Geostationary Navigation Overlay Service (EGNOS)", IST-Africa 2011 Conference Proceedings, May 11, 2011, pp. 1-14, XP032077102.

Mohamed Sahmoudi, et al., "U-SBAS: A Universal Multi-SBAS Standard to Ensure Compatibility, Interoperability and Interchangeability", 2010 5th ESA Workshop on Satellite Navigation Technologies and European Workshop on GNSS Signals and Signal Processing (NAVITEC), Dec. 8, 2010, pp. 1-18, XP031898945.

George M. Dillard, et al., "Cyclic Code Shift Keying: A Low Probability of Intercept Communication Technique", IEEE Transactions on Aerospace and Electronic Systems, Jul. 2003, pp. 786-798, vol. 39, No. 3.

* cited by examiner

SATELLITE PAYLOAD FOR AUGMENTATION SYSTEMS

CROSS-REFERENCE TO RELATED APPLICATION

This application claims priority to foreign French patent application No. FR 1102464, filed on Aug. 5, 2011, the disclosure of which is incorporated by reference in its entirety.

FIELD OF THE INVENTION

The present invention relates to the field of augmentation systems, for augmenting the integrity and accuracy and robustness of satellite navigation systems.

The invention relates more particularly to the uplink between a number of navigation land earth stations and a satellite dedicated to the transmission of augmentation data. The subject of the invention is notably a digital navigation payload that is semi-transparent to such a satellite.

Hereinafter, the following acronyms, well known in the field, will be used. The satellite navigation and positioning systems are generally designated by GNSS systems (Global Navigation Satellite Systems). The performance augmentation systems are called SBAS systems (Satellite Based Augmentation Systems). The ground stations suitable for transmitting augmentation data to the satellite are called NLES stations (Navigation Land Earth Stations). The ground stations suitable for receiving satellite signals comprising augmentation data and for performing measurements on these signals are commonly called RIMS stations (Ranging & Integrity Monitoring Stations).

BACKGROUND

The known SBAS augmentation systems make it possible to deliver in real time corrections to the GNSS receivers in order, notably, to increase the accuracy of the geo-localization that is performed. They also make it possible to broadcast information used to improve the integrity of the service supplied by the system. Generally, the corrections and other information generated and broadcast by such systems are called augmentation data and are transmitted in the form of augmentation messages directly in the navigation signal.

To produce and broadcast such data the SBAS systems generally consist of RIMS ground stations which permanently measure the GNSS signals transmitted by the navigation satellites, processing centres which receive these measurements and generate the augmentation messages and NLES ground stations which transmit these messages by the GNSS navigation signal to an SBAS augmentation satellite which serves as a relay by retransmitting the received signal to the GNSS receivers. In such a system, the payload of an SBAS satellite is said to be transparent, which means that no processing resulting in a modification of the content of the user received signal is performed onboard the satellite.

Such systems have limitations regarding the availability and the continuity of operation that they offer which is guaranteed only at the cost of additional complexity of the system, notably through a redundancy of some equipment items.

Since the payload of an SBAS satellite is of transparent type, it does not allow simultaneous access to its resources. The implementation of hot redundancy between a nominal NLES ground station and a redundant standby NLES station is thus not possible because the SBAS satellite is capable only of receiving and retransmitting a signal at nominal power transmitted by a single NLES station called master or nominal station.

The expression hot redundancy is used with reference to a system for which at least two NLES ground stations can transmit a signal simultaneously over the uplink channel of the SBAS satellite. By contrast, the term cold redundancy is used when at least two stations are available for the transmission of the navigation signal to the SBAS satellite but they do not transmit simultaneously. The principle of cold redundancy is applied to the known SBAS systems. When a failure of the nominal NLES station is detected, the standby NLES station, which is not active by default, is started up in order to handle the switching of stations and the continuation of service. The time needed to start up the standby station results in a loss of continuity and of consequential service interruption, which may exceed a minute. This interruption time is also due to the following processing operations, which are necessary for re-establishing the link: detection of the fault, switch over to the redundant NLES station, stabilization of the station servo control loops, acquisition of the required integrity level.

Another problem associated with the transparent aspect of the SBAS satellite relates to the integrity of the navigation message received by this satellite. The known solutions implement an integrity check on the signals in the NLES ground stations. This check is performed by comparing the navigation signal transmitted on the uplink channel with the signal transmitted by the SBAS satellite on the downlink channel, which is picked up by the NLES stations.

The detection of a possible scrambling or misrepresentation of the navigation signals is performed on the ground and results either in the broadcasting of a specific alert message which is not instantaneous, or a cessation of transmission from the NLES station. There is no possible way of preventing the broadcasting of a misrepresented signal on the SBAS satellite itself, except by switching off the payload via a remote control link from the ground. This type of operation can lead to a loss of availability for the GNSS receivers which have to wait for the satellite to transmit a new valid signal.

A third problem lies in the use, for the transmission of the navigation signals transmitted by the NLES stations, of multiple frequency bands. For example, the GPS systems can use three frequency sub-bands in band L, namely the bands L1, L2 and L5 for various uses. Similarly, the European Galileo system provides for the use of four frequency sub-bands. Furthermore, the operational maintenance of the system may require the transmission of test channels.

The transmission of the signals over the uplink between a NLES station and the satellite is done conventionally according to an FDMA-type frequency plan and on a single polarization, that is to say that each signal is transmitted in the frequency band (L1, L2, L5, etc.) which corresponds to it. The multiplicity of the channels can therefore result in a very significant spectral occupancy, and lead to an increase in the complexity of the ground stations and of the payload.

Onboard the satellite, the payload provides a number of processing channels suited to each frequency band. The transmission of the signals on at least two distinct frequency bands leads to a differential dispersion in gain and phase between the navigation channels relative to these different frequencies. In practice, the propagation channel leads to different disturbances (noise, impact of the ionosphere) according to the transmission frequency. The signals must therefore be corrected in amplitude, in delay and in phase to compensate these differential errors. Furthermore, difficulties in pairing and calibrating the channels between them result in poor simultaneous management of signals transmitted on two or more distinct frequency bands, which results in a performance degradation for the user of the system.

SUMMARY OF THE INVENTION

The present invention aims notably to overcome the above-mentioned limitations of the known SBAS systems by proposing a payload for an SBAS satellite that is digital and semi-transparent, that is to say which still allows for the satellite mission of transparently relaying navigation and augmentation messages to be fulfilled while introducing certain specific processing operations on the satellite that make it possible to improve the security, the service continuity, the control of the integrity checking and the radio performance.

To this end, the subject of the invention is a payload for augmentation satellite comprising an input channel suitable for receiving navigation signals transmitted by at least one navigation land earth station in a first frequency band and a plurality of output channels, each suitable for broadcasting navigation signals in a frequency band different from said first band and from other broadcasting bands, characterized in that it also comprises a navigation processor suitable for implementing the following operations for each of said received signals:
   from a first set of spreading codes each associated with a navigation land earth station and for each of said codes, unspreading the signal in phase in order to extract a pilot signal,
   authenticating said pilot signal and deducing from it the station transmitting said signal,
   if the authentication is negative, blocking said navigation signal,
   measuring the signal-to-noise and interference ratio affecting said pilot signal,
   retaining, from the navigation signals received, the one that exhibits the highest signal-to-noise and interference ratio and for which the authentication is positive, said retained signal being called nominal signal, the station transmitting the nominal signal being called nominal station, the other transmitting stations being called redundant stations,
   from a second set of spreading codes each associated with a type of navigation signal intended to be transmitted on one of the broadcasting frequency bands and for each of said codes, unspreading the nominal navigation signal in quadrature,
   transmitting said nominal navigation signal in the broadcasting frequency band associated with the spreading code used.

According to a particular aspect of the invention, said pilot signal is first demodulated according to a "Cyclic Code Shift Keying" type modulation, the authentication of the pilot signal being performed by identifying the code associated with said modulation.

Another subject of the invention is a payload for augmentation satellite comprising an input channel suitable for receiving navigation signals transmitted by at least one navigation land earth station in a first frequency band and a plurality of output channels, each suitable for broadcasting navigation signals in a frequency band different from said first band and from other broadcasting bands, characterized in that it also comprises a navigation processor suitable for implementing the following operations for each of said received signals:
   demodulating said received signal according to a "Cyclic Code Shift Keying" type modulation,
   authenticating said received signal by identifying the code associated with said modulation and deducing from it the station transmitting said signal,
   if the authentication is negative, blocking said navigation signal,
   measuring the signal-to-noise and interference ratio affecting said received signal,
   retaining, from the navigation signals received, the one that exhibits the highest signal-to-noise and interference ratio and for which the authentication is positive, said retained signal being called nominal signal, the station transmitting the nominal signal being called nominal station, the other transmitting stations being called redundant stations,
   from a set of spreading codes each associated with a type of navigation signal intended to be transmitted on one of the broadcasting frequency bands and for each of said codes, unspreading the nominal navigation signal in quadrature,
   transmitting said nominal navigation signal in the broadcasting frequency band associated with the spreading code used.

According to a particular aspect of the invention, when the signal-to-noise and interference ratio measured on said nominal signal decreases below a predetermined threshold, the new nominal signal retained is the one which exhibits the highest signal-to-noise and interference ratio.

In a variant embodiment, the payload according to the invention also comprises a return channel suitable for broadcasting, in said first frequency band, at least one service signal to at least one navigation land earth station, said service signal comprising at least the measurement of the signal-to-noise and interference ratio of at least the nominal signal, said service signal being suitable for implementing a servocontrol of the transmission power of said redundant stations to the transmission power of the nominal station.

According to a particular aspect of the invention, said service signal also comprises the measurements of the signal-to-noise and interference ratio of the navigation signals received by the satellite and transmitted by all the transmitting stations.

According to a particular aspect of the invention, said service signal also comprises a measurement of the time offsets between the reception, by the satellite, of the nominal signal on the one hand and of the signals transmitted by the redundant navigation land earth stations, said service signal being suitable for implementing a time synchronization between said stations.

According to a particular aspect of the invention, said return channel is also suitable for broadcasting, in said first frequency band, the nominal navigation signal.

According to a particular aspect of the invention, said first frequency band is the band C or Ku and said broadcasting frequency bands are at least the bands L1 and L5.

According to a particular aspect of the invention, said spreading codes are Walsh codes.

Another subject of the invention is an augmentation satellite comprising a payload according to the invention, suitable for receiving a navigation signal over an uplink in a first frequency band and rebroadcasting said signal over a downlink in a plurality of broadcasting frequency bands.

Another subject of the invention is a navigation land earth station suitable for receiving an augmentation message and for generating a navigation signal containing said message, said navigation signal being spectrally spread using a first spreading code associated with its broadcasting frequency band, said navigation signal being transmitted over an uplink in a first frequency band different from the broadcasting frequency band.

According to a particular aspect of the navigation land earth station according to the invention, said navigation signal is added in quadrature to a pilot signal that is spectrally spread using a second spreading code associated with said navigation land earth station.

According to a particular aspect of the navigation land earth station according to the invention, a "Cyclic Code Shift Keying" type modulation is first applied to said navigation signal or to said pilot signal.

According to a particular aspect of the navigation land earth station according to the invention, the polarization of the transmitted navigation signal is different according to the broadcasting frequency band.

Another subject of the invention is an augmentation system comprising:
- at least one observation station suitable for receiving a radionavigation signal transmitted by at least one radionavigation satellite and for performing measurements on said signal,
- at least one processing centre suitable for receiving said measurements transmitted by at least one measurement station and for generating, from said measurements, at least one augmentation message,
- a plurality of navigation land earth stations according to the invention,
- at least one augmentation satellite according to the invention.

In a particular embodiment, the augmentation system according to the invention is suitable for implementing a switching of navigation land earth stations of hot redundancy type.

In a particular embodiment, the polarization of the transmitted navigation signal is different between two redundant navigation land earth stations.

In a particular embodiment, on reception of a service signal transmitted by said augmentation satellite and comprising at least the measurement of the signal-to-noise and interference ratio of at least said nominal signal, said navigation land earth stations implement a servocontrol of their transmission power to the transmission power of the nominal station.

In a particular embodiment, on reception of said service signal, said navigation land earth stations implement a time synchronization of their respective transmissions.

BRIEF DESCRIPTION OF THE DRAWINGS

Other features and advantages of the invention will become apparent from the following description in light of the appended drawings which represent.

DETAILED DESCRIPTION

Figure 1:
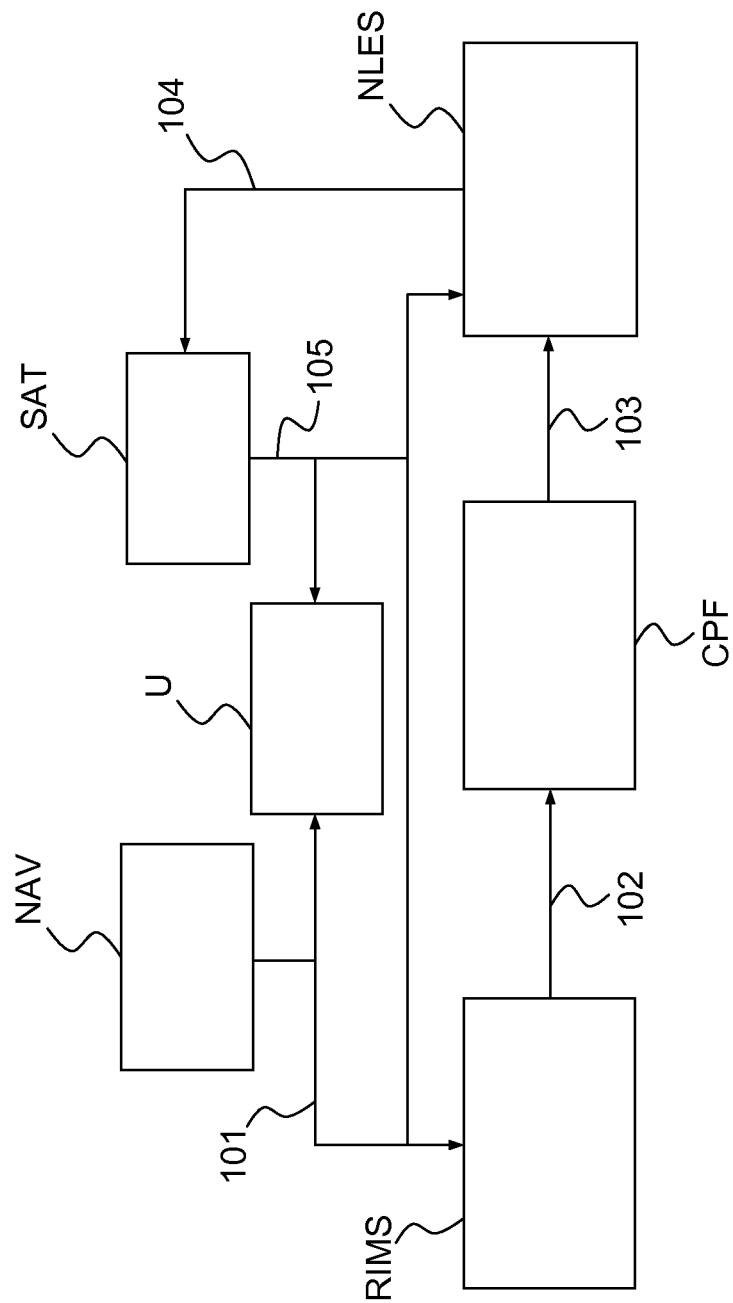
FIG. 1, a block diagram of the architecture of an SBAS system according to the prior art, FIG. 2, a functional block diagram of the payload of an SBAS satellite according to the prior art, FIG. 3, a diagram illustrating the generation of the uplink signal between an NLES station and an SBAS satellite, according to the prior art, FIG. 4a, a diagram illustrating the generation of navigation signals by an NLES station according to the invention, FIG. 4b, a variant embodiment of FIG. 4a, FIG. 5a, a functional block diagram of the payload of an SBAS satellite according to the invention, in a first embodiment, FIG. 5b, a functional block diagram of the payload of an SBAS satellite according to the invention, in a second embodiment, FIG. 6, a block diagram of the architecture of an SBAS system according to the invention, in the second embodiment of the payload, FIG. 7, a functional block diagram of the navigation processor according to the invention.

FIG. 1 schematically represents, in a block diagram, the overall architecture of an SBAS system according to the prior art. Such a system is suitable for producing augmentation data from measurements performed on the navigation signals 101 transmitted by a plurality of radionavigation satellites NAV. The measurements and data originating from the radionavigation satellites NAV are collected by a plurality of observation stations RIMS then transmitted 102, at a given rate, to a plurality of processing centres CPF. The latter produce, from the measurements received, an estimation of the differential corrections to be applied to the radionavigation signal then generate augmentation messages, which include these corrections and are then transmitted 103 to a navigation land earth station NLES. The NLES station receives the augmentation messages and transmits them 104 to an augmentation satellite SAT to then be broadcast 105 to the users U and to the ground stations RIMS, NLES. The augmentation messages are, to this end, integrated, in a way similar to the navigation messages, in a navigation signal compatible with the GNSS system. A navigation signal, generated by an NLES station then broadcast by a satellite SAT, therefore contains both navigation messages and augmentation messages which can be exploited by the GNSS receivers to improve their locating performance. The augmentation satellite SAT may be a geostationary satellite or a high earth orbit HEO satellite or even a satellite in inclined geostationary orbit of IGSO (Inclined Geosynchronous Satellite Orbit) type. The NLES station performs an integrity check on the messages received, transmitted by the processing centres CPF, with the messages broadcast by the augmentation satellite SAT over the downlink. The signal retransmitted by the augmentation satellite SAT is also received by the RIMS stations. The processing centre CPF can address a second redundant NLES station, in the event of failure of the main NLES station, but this redundancy is of cold type, that is to say that the redundant NLES station is off when the main station is transmitting. The uplink channel between an NLES station and an augmentation satellite SAT operates in band Ku or in band C. The downlink channel between an augmentation satellite SAT and an RIMS station or a user U operates in band L for the transmission of the navigation signal.

Furthermore, some known augmentation systems such as the European EGNOS system, implement a return channel in band Ku or in band C between the augmentation satellite SAT and the NLES ground stations allowing for a bi-frequency estimation (Ku or C and L) of the physical parameters of the satellite link. This return channel is used only to implement a servo control of the transmission time of the satellite through the use of a long loop. In order to exactly synchronize the transmission time of the navigation signal by the augmentation satellite SAT, the NLES ground stations advance or delay the transmission of their signal over the uplink channel in order to synchronize the satellite with a fixed clock.

When there is no return channel available, the temporal servo control can also be produced through the navigation signal transmitted to the users in band L, but with a PRN code specific to the test procedures and which will therefore be unseen by the users.

The diagram of FIG. 1 represents only one unit for each entity that the system comprises, but this in reality comprises a number of augmentation satellites SAT, a number of RIMS observation stations, a number of processing centres CPF and a number of NLES transmission stations. As a general rule, two NLES transmission stations (nominal and redundant) are used for an augmentation satellite.

When an NLES station is defective, a switch over is performed to the redundant NLES station, which results in an interruption of the signal transmitted over the uplink channel, lasting a few seconds. The re-establishing of the transmission of an usable signal results in an additional delay of several tens of seconds and the complete restoration of the system takes around a minute. This loss of service continuity particularly impacts on the applications with high availability demand such as the aeronautical applications. It results, for the users in sight of a single augmentation satellite, in a total loss of service and, for the others, the need to switch to another satellite. Furthermore, even on resumption of service, the integrity checking loop which is used to guarantee the integrity of the messages transmitted, is not immediately operational as long as the ground stations have not locked on again to the new signal transmitted by the satellite. The monitoring of the integrity of the system is not then effective on the downlink and a misrepresentation of this downlink may impact a large regional area without the system being able to detect it.

Figure 2:
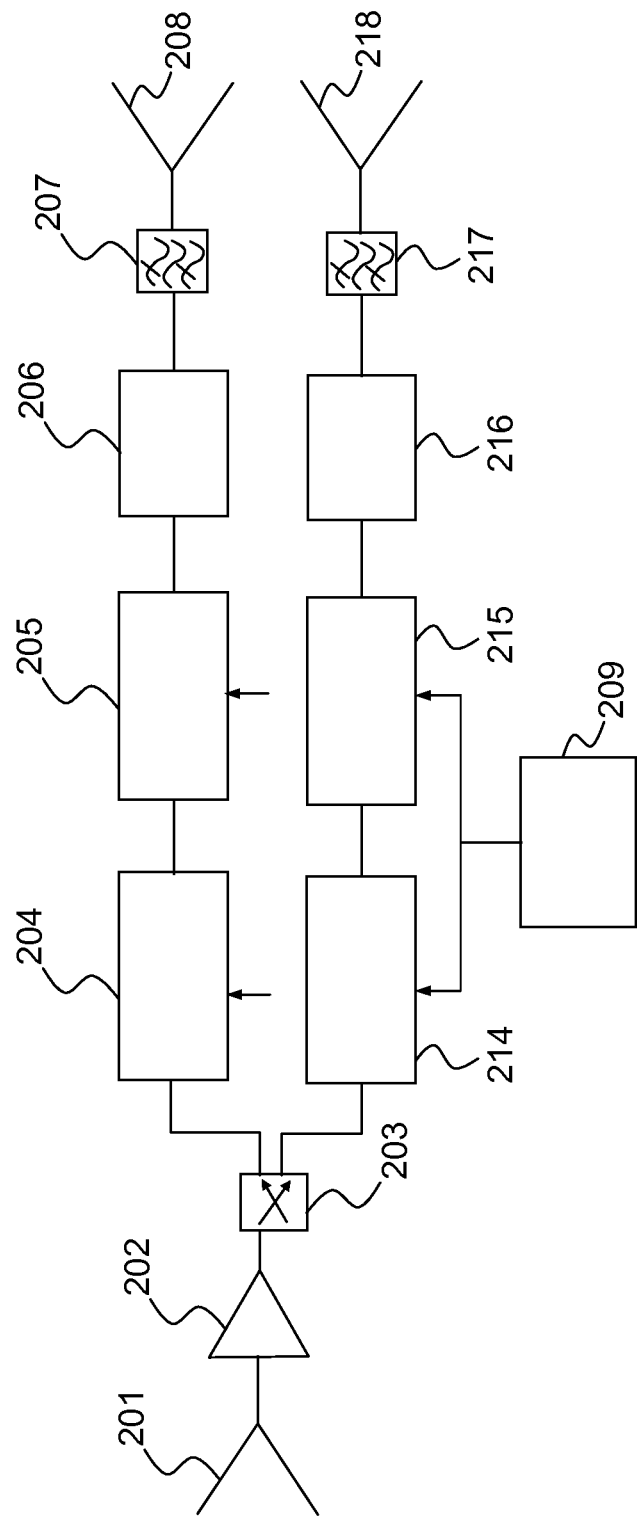

FIG. 2 schematically represents, in a block diagram, the main functions of the payload of an SBAS augmentation satellite according to the prior art. The signals transmitted by the NLES station are received on an input 201, suitable for receiving signals in band C or in band Ku, amplified by a low-noise amplifier 202, then are directed, via a distributor 203, to a frequency conversion channel in one of the sub-bands of the band L used by the GNSS system. In the diagram of FIG. 2, two conversion channels are represented, making it possible, respectively, to convert the signal into band L1 or into band L5 for retransmission to the users of the GNSS system.

A conversion channel comprises a first frequency transposition device 204,214 to an intermediate frequency, a second frequency transposition device 205,215 to a frequency in band L1 or L5, a reference local oscillator 209, an amplifier 206,216, a band pass filter 207,217 and an output 208,218 suitable for transmitting signals in band L1 or L5.

Such a payload is said to be transparent because it performs no specific processing on the received signal other than the processing needed for the frequency transposition to the users' band. Thus, the signals received by the satellite are always retransmitted to the ground, with no check, at this level, as to their integrity. Furthermore, such a payload consists only of analogue circuits and the adaptation to two user frequency bands entails duplicating the frequency conversion channel, which presents drawbacks. The two channels have to be paired in amplitude, phase and differential delays.

Figure 3:
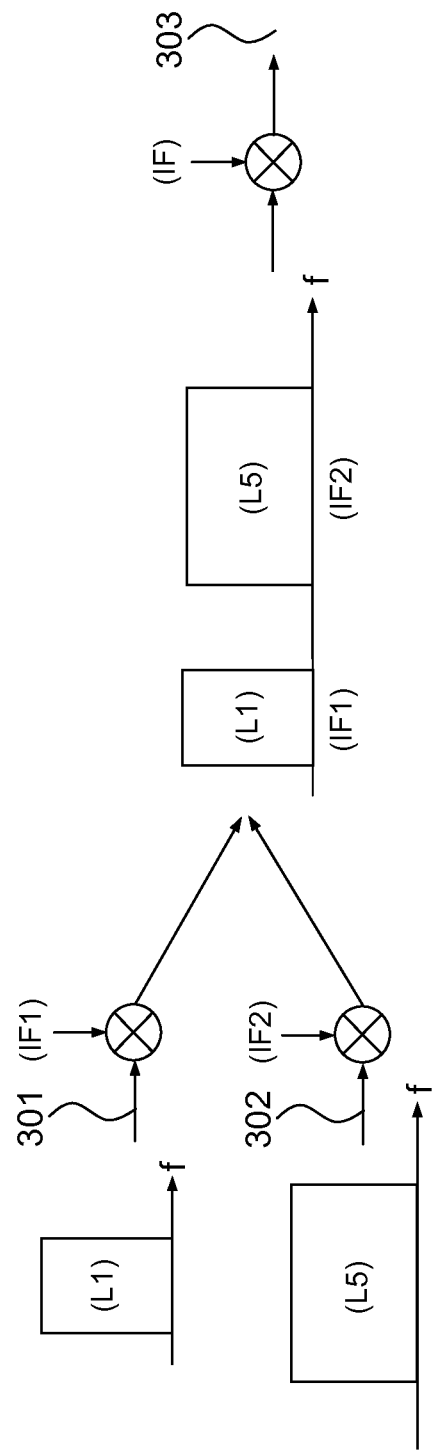

FIG. 3 schematically represents the generation of the signal transmitted over the uplink channel between an NLES station of the prior art and a satellite SAT. The signal to be transmitted 301,302 is first of all converted into frequency L1 or L5 depending on the frequency band of the final user. Two local oscillators IF1,IF2 are used for this purpose. The resulting signal complies with an FDMA-type frequency plan and it is then converted into band C or Ku through the intermediary of a third local oscillator IF. The frequency bandwidth of the navigation signal is therefore proportional to the number of augmentation signals to be transmitted.

The aim of the invention is notably to overcome the drawbacks of the known systems described with the help of FIGS. 1, 2 and 3.

Figure 4A:
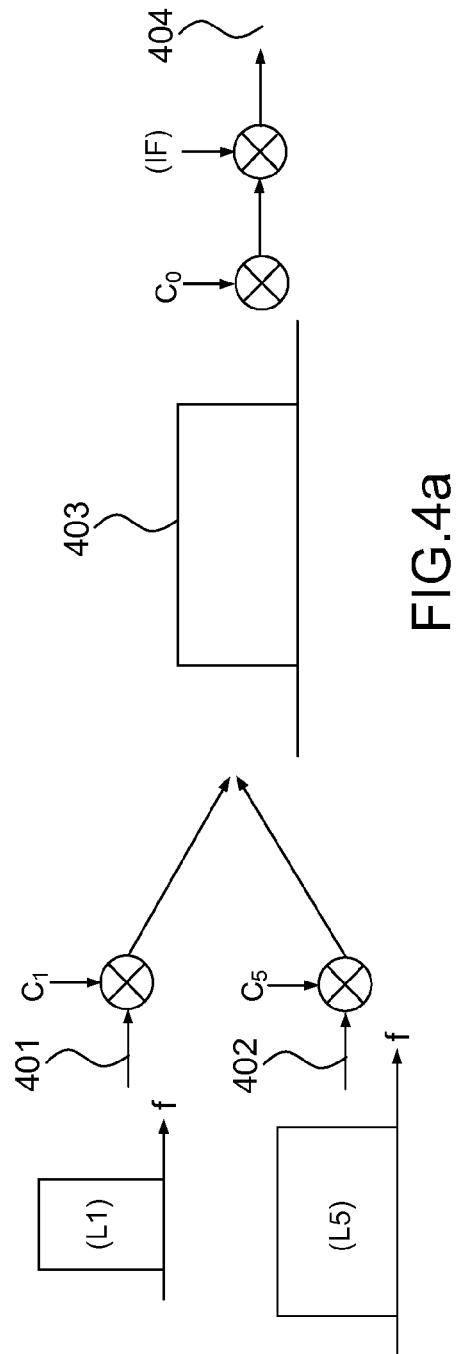

FIG. 4a represents, in a diagram, the modification, according to the invention, of the signal transmitted by an NLES station to an augmentation satellite SAT. To simplify the description, only the case of two navigation signals is presented, said signals containing augmentation messages to be transmitted over two distinct frequency bands L1, L5.

Each navigation signal to be transmitted 301,302 is spread by a specific spreading code C1,C5, for example a Walsh code, so that each signal 401,402 occupies the same spectral bandwidth. The function of this code is to unambiguously identify the transmission channel associated with the frequency band L1 or L5. The duly spread signals 401,402 are then transmitted on the same central frequency, in accordance with the CDMA access method. In particular, the spreading codes used are mutually orthogonal so as to allow for a simultaneous transmission of signals over the uplink channel emanating from a number of NLES stations. The navigation signal 403 obtained in this way has added to it a pilot signal, phase-shifted by 90°, and also spread via a specific spreading code C0 which serves to identify the transmitting NLES station and to authenticate the navigation signal. The authentication method used can be any known method that makes it possible to ensure an identification of the received signal. Examples that can in particular be cited are the authentication methods described in the following patent applications: FR2921528 relating to a method providing the means for recognizing the origin and/or the content of an RF signal or US2009/0179743, entitled "Pseudo-random authentication code altering scheme for a transponder and a base station" or even US 2005/0041955, entitled "Authentification of data in a digital transmission system". So-called "watermarking" techniques, suitable for the satellite links, can also be used.

The resulting signal is finally transposed into band C or Ku through a local oscillator IF to be transmitted over the uplink channel to the augmentation satellite SAT.

By modifying the generation of the navigation signal as indicated in FIG. 4a, the invention makes it possible notably to eliminate the differential errors induced by the propagation channels associated with the different uplink frequency bands L1,L5. The introduction of the pilot signal makes it possible both to produce an authentication, onboard the satellite, of the transmitted signal and to augment the signal-to-noise ratio estimation efficiency. Furthermore, the problems of synchronization between the two channels are also eliminated since the signals previously intended for transmission in band L1 or L5 are now spectrally coded and transmitted on one and the same frequency. Finally, the use of a spreading code C0 specific to each transmitting NLES station makes it possible to implement a redundancy between stations of hot type as will be explained later.

Figure 4B:
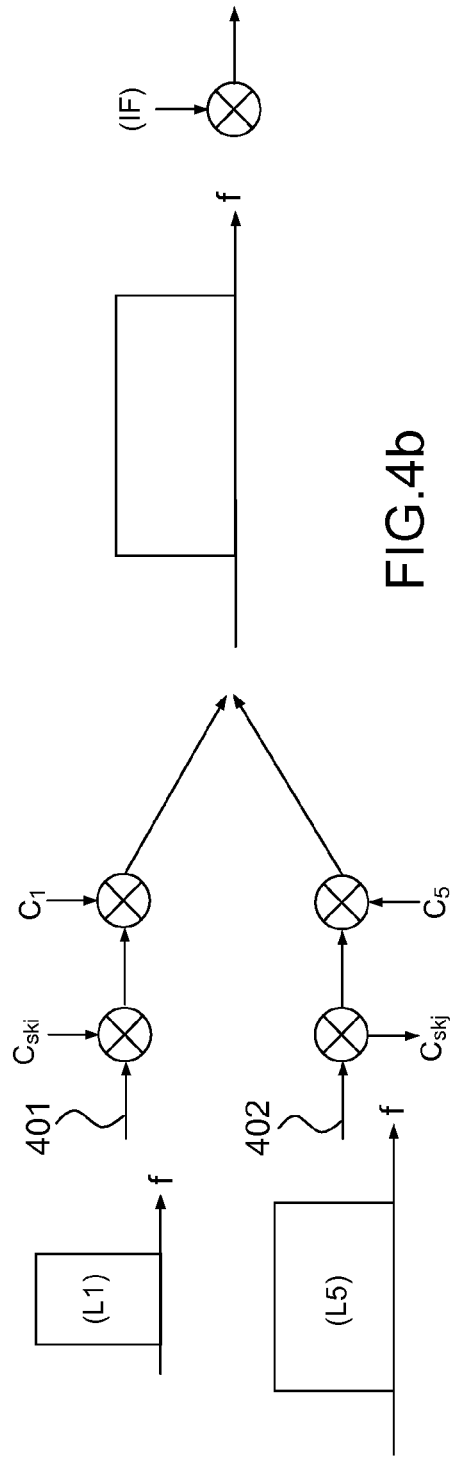

In a variant embodiment of the invention illustrated in FIG. 4b, a CCSK (Cyclic Code Shift Keying) type modulation is applied previously to the navigation signals in band L1 and L5 before the step of spectral spreading using the Walsh codes C1,C5.

The CCSK modulation technique is well known to those skilled in the art, for example from the publication "Cyclic Code Shift Keying: A Low Probability of Intercept Communication Technique, IEEE Transactions on Aerospace and Electronic Systems, Vol. 39, No 3, July 2003". It consists in using a single Csk spreading code of PN (Pseudo Noise) type to modulate each navigation signal by shifting the sequence of the code by a predetermined number of symbols to produce the modulation of each signal.

This variant embodiment makes it possible to eliminate the pilot signal and to produce the authentication of the NLES station directly by identifying the CCSK codes applied to the navigation signals. A single CCSK code is used for all the transmitting NLES stations by each time shifting the sequence of the code by a predetermined number of symbols before producing the modulation of the signal.

In another variant embodiment of the invention (not represented), the pilot signal can be retained but over modulated by a CCSK code in order to improve the efficiency in detecting and therefore authenticating the different NLES stations through the good properties of the CCSK modulation self-correlation function.

In another variant of the invention, different polarizations are employed for the transmission of the signals in band L1 and L5. For example, a right polarization is used for one of the signals and a left polarization for the other. In this way, the cross-correlation between the two signals is limited which makes it possible to further improve the performance while keeping a low differential dispersion between the signals.

In another variant of the invention, the same polarizations are employed for the transmission of the signals in band L1 and L5 of one and the same NLES station but different polarizations are used for two different redundant NLES stations. This scenario also encompasses the case where a given NLES station transmits only signals in band L1 and another redundant NLES station transmits only signals in band L5 with a different polarization from the signals in band L1 transmitted by the first station.

Figure 5A:
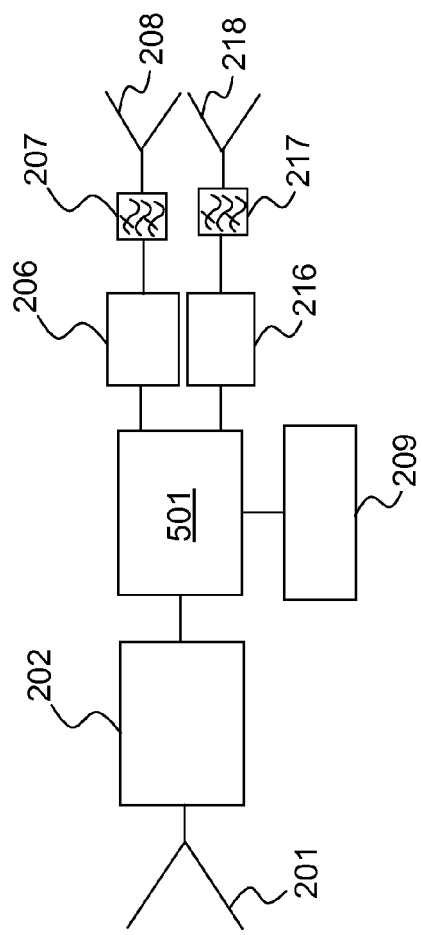

FIG. 5a schematically represents, in a block diagram, the main functions of the payload of an SBAS augmentation satellite according to the invention. The elements that are common with the payload according to the prior art described in FIG. 2 are numbered with the same references.

The frequency transposition devices 204,205,214,215 for each channel are eliminated and replaced by a single navigation processor 501 which receives the navigation signal transmitted by one or more NLES stations and transmits it to one of the amplification and filtering channels for broadcasting to the users according to the frequency band L1,L5 identified by the associated spreading code C1,C5.

Figure 5B:
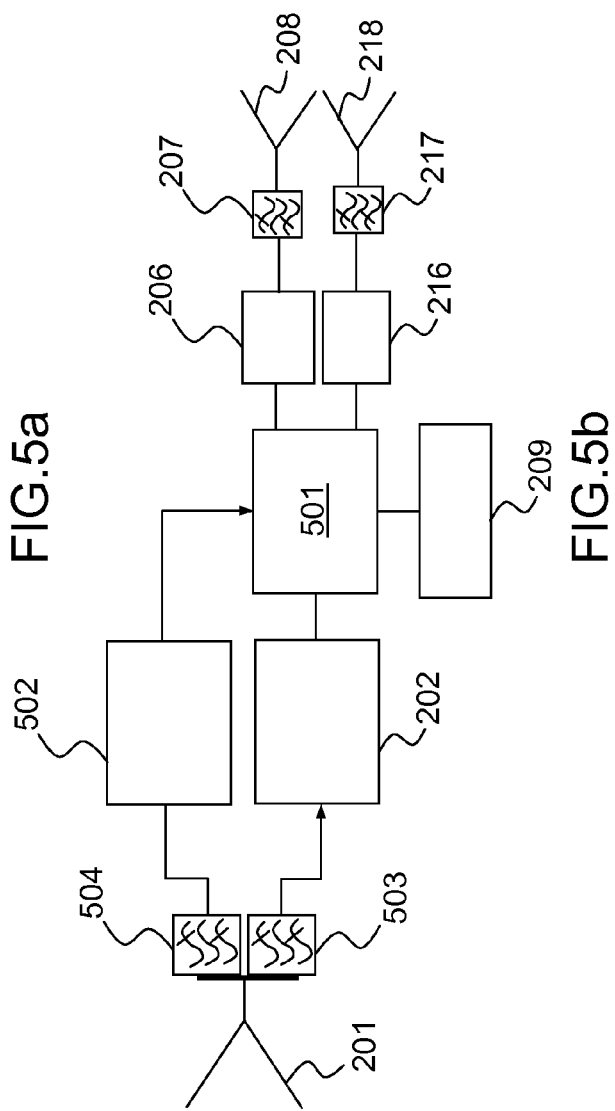

FIG. 5b schematically represents a variant embodiment of the payload according to the invention. In this variant, a specific return channel to the NLES station or stations on the ground is implemented through an amplifier 502 and a band pass filter 504. A second band pass filter 503 is necessary to separate the signal received by an NLES station from the signal retransmitted to this same station. This return channel operates in band Ku or C just like the uplink channel to the augmentation satellite.

As mentioned above, some augmentation systems, like the European EGNOS system, already implement a specific return channel for the augmentation satellites, this channel being used solely for the temporal servo control of the satellite on a time base linked to the ground stations.

In the variant embodiment of the invention now being described, the return channel of the augmentation satellite also makes it possible to transmit certain information to the NLES ground stations in order to further improve the service continuity upon a switchover between two transmitting stations. In particular, a measurement of the signal-to-noise plus interference ratio SNIR of the uplink is performed onboard the satellite then retransmitted to the NLES stations via this return channel. A relative synchronization between nominal station and redundant station is also provided.

Figure 6:
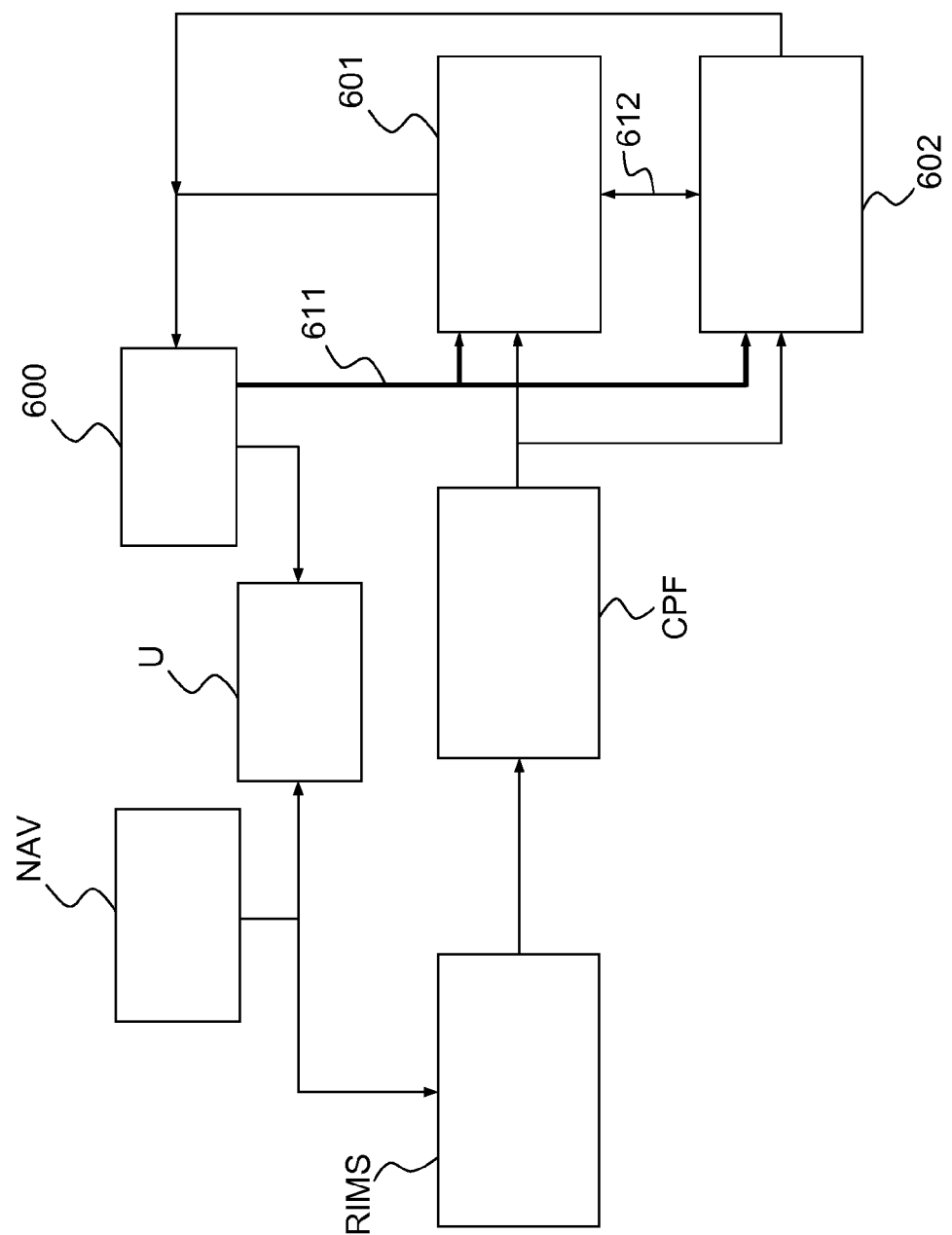

FIG. 6 illustrates the overall operation of an SBAS system according to the embodiment of the invention for which a return channel 611 is implemented between the augmentation satellite 600 and the navigation land earth stations 601,602. From the information transmitted by the satellite, the earth stations 601,602 establish a synchronization link 612 between them. This link 612 is used notably to ensure the mutual time synchronization of the stations.

Figure 7:
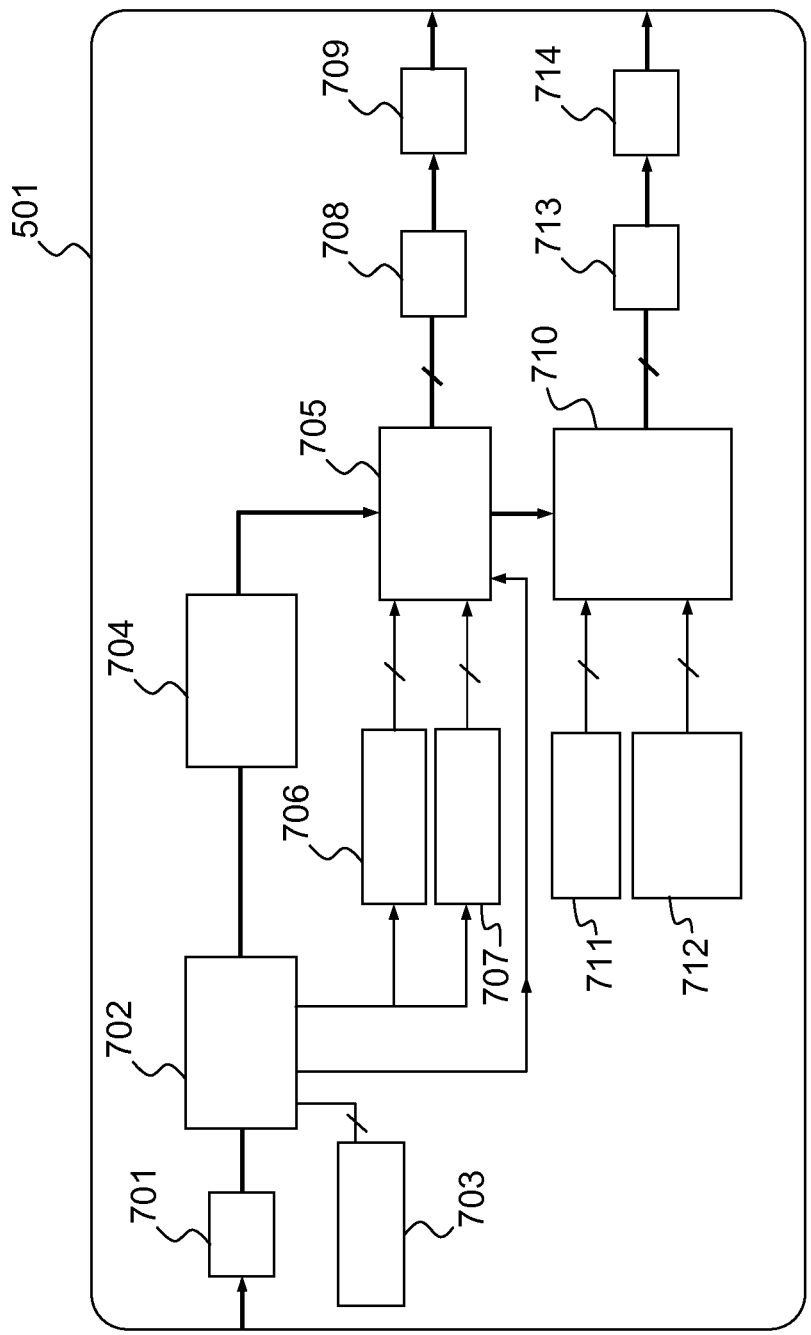

FIG. 7 describes a functional block diagram of the navigation processor 501 according to the invention.

The analogue signal received at the input of the processor 501 is digitally converted via an analogue/digital converter 701. The digital signal obtained is supplied as input for a first pilot signal processing module 702. This module 702 provides a synchronization and a demodulation of the pilot signal from the spreading codes referenced for each NLES station in a memory 703. The demodulated pilot signal is authenticated, according to the selected prior art authentication method, via an authentication module 706. The ratio between the signal and the combination of the noise and of the interference, SNIR, is measured via a measurement module 707.

In parallel, the signal in quadrature, corresponding to the navigation signal transmitted by different NLES stations, is transmitted to a demultiplexer 704 which associates the received navigation signal with an identifier of an NLES station according to the reference spreading code C0 of said station. The navigation signal associated with the identifier of the transmitting NLES station is then transmitted to a module 705 which is notably responsible for authorizing the retransmission of the signal to the users. Based on the authentication result produced by the authentication module 706, the signal may possibly be blocked in the case where this result is negative.

In the case where a pilot signal is not used (case not represented in FIG. 7), the authentication of the transmitting NLES station is produced directly on the CCSK codes applied to the navigation signals. The measurement of the signal-to-noise plus interference ratio SNIR of the uplink is also performed directly on the navigation signals and not on the pilot signal.

If the authentication is positive, the signal-to-noise and interference ratio SNIR measurements obtained for the different NLES stations are compared and only the signal transmitted by the station benefiting from the best link budget is retained to be retransmitted to the ground. When the best SNIR ratio is obtained for a signal transmitted by a redundant station, which is therefore not the optimal signal actually retransmitted, the payload according to the invention performs a station switchover by selecting the new optimal signal as the one transmitted by the redundant station exhibiting the highest SNIR ratio. Thus, the switchover is performed transparently onboard the satellite, without causing any service interruption. The decision to switchover between two transmitting NLES stations is made by the navigation processor 501 when the SNIR ratio measured on the nominal signal decreases below a predetermined threshold.

In the case where a return channel is available (embodiments of the invention described in FIGS. 5b and 6), the signal-to-noise and interference ratio SNIR measurements are retransmitted to the NLES stations on the ground via the available return channel. To this end, said measurements are transmitted by a modulated signal, for example modulated using a BPSK modulation, and on a different frequency to that used to transmit the navigation signal. An FDM-type frequency plan is used, The return channel according to the invention therefore allows, on the one hand, for the transmission, on a first frequency band, of the navigation signal, both nominal and redundant, for the purposes of time servocontrolling the signal transmitted by the satellite, and, on the other hand, for the transmission, on a second frequency band, of a service signal conveying the SNIR ratio information for each identified transmitting NLES station. The module 705 is, for this purpose, responsible for generating the service signal conveying the SNIR ratio information estimated by the module 707. The return channel is implemented in the form of at least one oversampling module 708 and one digital/analogue converter 709.

Furthermore, when a switchover is performed onboard the satellite, the choice of the nominal NLES station can also be retransmitted via this service signal in order to inform the ground stations that a switchover has taken place.

When the NLES stations 601,602 receive the service signal transmitted by the augmentation satellite 600, they adjust their transmission power so that each station transmits a signal that is servocontrolled in gain or amplitude on the optimal signal, in other words the one transmitted by the nominal NLES station. Thus, all the signals transmitted over the uplink channel from the augmentation satellite exhibit an equivalent power, which further facilitates the transparent switchover between stations, onboard the satellite, when the nominal station fails.

To produce this power servocontrol, only the measurement of the SNIR ratio of the nominal signal is needed. In a variant embodiment of the invention, all the SNIR ratio measurements are transmitted by the satellite, to enable the redundant NLES stations to estimate the quality of their link.

In another variant embodiment of the invention, in addition to the measurement of the SNIR ratio, the payload of the satellite performs a measurement of the time offset between the different signals received on the uplink channel, originating from the nominal NLES station on the one hand and from the redundant NLES stations on the other hand. The signal from the nominal station is identified by virtue of the spreading code of the pilot signal transmitted as explained previously or directly from the identification of the CCSK codes of the navigation signals themselves depending on the variant of the invention that is selected. A measurement of the time offset between the instant of reception of the nominal signal and the instant of reception of each of the signals transmitted by the redundant NLES stations is performed. This offset measurement is also transmitted in the service signal via the satellite's return channel. This information is received by the NLES ground stations which can then provide a time synchronization, via a terrestrial link 612, for their respective transmitters, in order to synchronize their transmissions on the uplink channel.

This synchronization further improves the service continuity in the event of a station switchover performed by the payload.

The invention aims to synchronize in time and in power all the signals transmitted by the different NLES stations on the uplink channel in order to implement a so-called hot redundancy.

Furthermore, each station, on reception of the navigation signal transmitted over the return channel, performs an integrity check by comparing the augmentation message received with the one previously transmitted. If this check is negative, the station stops transmitting. The satellite will no longer receive any navigation signal transmitted by this station and can perform a switchover to the redundant station that benefits from the best link budget.

Once the optimal navigation signal has been authenticated and selected from the different signals transmitted by the NLES stations, it is then transmitted to a second signal processing module 710 which performs the demodulation of the navigation signal according to its associated spreading code 711, and/or its polarization component. Specifically, a signal unspreading operation, based on the known spreading code. is performed. Each spreading code corresponds to a frequency band, in band L, used to transmit the navigation signals to the users. Once the frequency band is identified, for example the band L1 or L5, the navigation signal is retransmitted to the users of the system via a frequency conversion channel comprising at least one oversampling module 713 and one digital/analogue converter 714. In the case where no pilot signal is used, the authentication of the transmitting NLES station is performed jointly with the CCSK demodulation.

Furthermore, the signal processing module 710 also makes it possible to apply corrections, in amplitude, phase and/or delay, to the signals based on one or more calibration tables 712. These calibration tables are completed on the basis on temperature-related measurements performed on the payload and that make it possible to identify imbalances in amplitude, delay and phase, that are differential between each band L transmission channel. These tables are generated from measurements performed before the commissioning of the satellite. The corrections are then updated according to the temperature of the equipment in service, measured elsewhere by a temperature measuring device. These corrections allow for an accurate balancing of the differential transmission paths.

An alternative way to produce the differential correction of the different band L transmission channels consists in using one or more redundant channels in transmission mode which indirectly make it possible to save the signal transmitted then measure the drifts between the saved transmitted signal and the received signal.

A particular use of the invention consists in using the nominal NLES station to broadcast operational signals in band L1 and L5 and a redundant NLES station to transmit test signals used to validate the system in order to test some of its functionalities or perform a qualification of the system.

In this case, the different spreading codes C1,C5,C0 used are specific to the test signals.

The test signals used can be transmitted by the same NLES station used to transmit the nominal navigation signals, with one and the same antenna polarization or with a cross polarization relative to the navigation signals. The test signals can also be transmitted by an NLES station specifically dedicated to the tests.

The invention notably offers the advantage of retaining the primary mission of the augmentation satellite, that is to say relaying the augmentation messages to the users, while improving the service continuity in the event of a switchover between redundant NLES stations. It also makes it possible to improve the authentication of the signals transmitted and to fight against any misrepresentations and it also improves the performance of the system when different frequency bands L1,L5 are used to transmit the navigation signals.

The invention claimed is:

1. A payload for augmentation satellite comprising an input channel suitable for receiving navigation signals transmitted by at least one navigation land earth station in a first frequency band and a plurality of output channels, each suitable for broadcasting navigation signals in a frequency band different from said first band and from other broadcasting bands, comprising a navigation processor suitable for implementing the following operations for each of said received signals:

from a first set of spreading codes each associated with a navigation land earth station and for each of said codes, unspreading the signal in phase in order to extract a pilot signal, authenticating said pilot signal and deducing from it the station transmitting said signal, if the authentication is negative, blocking said navigation signal, measuring the signal-to-noise and interference ratio affecting said pilot signal, retaining, from the navigation signals received, the one that exhibits the highest signal-to-noise and interference ratio and for which the authentication is positive, said retained signal being called nominal signal, the station transmitting the nominal signal being called nominal station, the other transmitting stations being called redundant stations, from a second set of spreading codes each associated with a type of navigation signal intended to be transmitted on one of the broadcasting frequency bands and for each of said codes, unspreading the nominal navigation signal in quadrature, transmitting said nominal navigation signal in the broadcasting frequency band associated with the spreading code used.

2. The payload for augmentation satellite according to claim 1, in which said pilot signal is first demodulated according to a "Cyclic Code Shift Keying" type modulation, the authentication of the pilot signal being performed by identifying the code associated with said modulation.

3. The payload for augmentation satellite according to claim 1, wherein, when the signal-to-noise and interference ratio measured on said nominal signal decreases below a predetermined threshold, the new nominal signal retained is the one which exhibits the highest signal-to-noise and interference ratio.

4. The payload for augmentation satellite according to claim 1, further comprising a return channel suitable for broadcasting, in said first frequency band, at least one service signal to at least one navigation land earth station, said service signal comprising at least the measurement of the signal-to-noise and interference ratio of at least the nominal signal, said service signal being suitable for implementing a servocontrol of the transmission power of said redundant stations to the transmission power of the nominal station.

5. The payload for augmentation satellite according to claim 4, wherein said service signal also comprises the measurements of the signal-to-noise and interference ratio of the navigation signals received by the satellite and transmitted by all the transmitting stations.

6. The payload for augmentation satellite according to claim 4, wherein said service signal also comprises a measurement of the time offsets between the reception, by the satellite, of the nominal signal on the one hand and of the signals transmitted by the redundant navigation land earth stations, said service signal being suitable for implementing a time synchronization between said stations.

7. The payload for augmentation satellite according to claim 4, wherein said return channel is also suitable for broadcasting, in said first frequency band, the nominal navigation signal.

8. The payload for augmentation satellite according to claim 1, wherein said first frequency band is the band C or Ku and said broadcasting frequency bands are at least the bands L1 and L5.

9. The payload for augmentation satellite according to claim 1, wherein said spreading codes are Walsh codes.

10. An augmentation satellite comprising a payload according to claim 1, suitable for receiving a navigation signal over an uplink in a first frequency band and rebroadcasting said signal over a downlink in a plurality of broadcasting frequency bands.

11. An augmentation system comprising:

at least one observation station suitable for receiving a radio navigation signal transmitted by at least one radio navigation satellite and for performing measurements on said signal, at least one processing centre suitable for receiving said measurements transmitted by at least one measurement station and for generating, from said measurements, at least one augmentation message, a plurality of navigation land earth stations suitable for receiving an augmentation message and for generating a navigation signal containing said message, said navigation signal being spectrally spread using a first spreading code associated with its broadcasting frequency band, said navigation signal being transmitted over an uplink in a first frequency band different from the broadcasting frequency band, at least one augmentation satellite according to claim 10.

12. The augmentation system according to claim 11, suitable for implementing a switching of navigation land earth stations of hot redundancy type.

13. The augmentation system according to claim 11, in which the polarization of the transmitted navigation signal is different between two redundant navigation land earth stations.

14. The augmentation system according to claim 11, wherein, on reception of a service signal transmitted by said augmentation satellite and comprising at least the measurement of the signal-to-noise and interference ratio of at least said nominal signal, said navigation land earth stations implement a servocontrol of their transmission power to the transmission power of the nominal station.

15. The augmentation system according to claim 11, wherein, on reception of said service signal, said navigation land earth stations implement a time synchronization of their respective transmissions.

16. A payload for augmentation satellite comprising an input channel suitable for receiving navigation signals transmitted by at least one navigation land earth station in a first frequency band and a plurality of output channels, each suitable for broadcasting navigation signals in a frequency band different from said first band and from other broadcasting bands, comprising a navigation processor suitable for implementing the following operations for each of said received signals:

demodulating said received signal according to a "Cyclic Code Shift Keying" type modulation, authenticating said received signal by identifying the code associated with said modulation and deducing from it the station transmitting said signal, if the authentication is negative, blocking said navigation signal, measuring the signal-to-noise and interference ratio affecting said received signal, retaining, from the navigation signals received, the one that exhibits the highest signal-to-noise and interference ratio and for which the authentication is positive, said retained signal being called nominal signal, the station transmitting the nominal signal being called nominal station, the other transmitting stations being called redundant stations, from a set of spreading codes each associated with a type of navigation signal intended to be transmitted on one of the broadcasting frequency bands and for each of said codes, unspreading the nominal navigation signal in quadrature, transmitting said nominal navigation signal in the broadcasting frequency band associated with the spreading code used.

17. A navigation land earth station configured to receive an augmentation message and to generate a navigation signal containing said augmentation message, said navigation signal transmitted over an uplink to a satellite and over a downlink from the satellite to the ground in a broadcasting frequency band taken among a plurality of different broadcasting frequency bands, said navigation land earth station further configured to spectrally spread said navigation signal using a first spreading code taken from among a plurality of different spreading codes and uniquely associated with its broadcasting frequency band, said navigation land earth station further configured to transmit said navigation signal over the uplink to the satellite in a first frequency band different from the broadcasting frequency band.

18. The navigation land earth station according to claim 17, in which said navigation signal is added in quadrature to a pilot signal that is spectrally spread using a second spreading code associated with said navigation land earth station.

19. The navigation land earth station according to Claim 18, in which a "Cyclic Code Shift Keying" type modulation is first applied to said navigation signal or to said pilot signal.

20. The navigation land earth station according to claim 17, in which a polarization of the transmitted navigation signal is different according to the broadcasting frequency band.

* * * * *